United States Patent [19]

Marquis et al.

[11] Patent Number: 5,178,788
[45] Date of Patent: Jan. 12, 1993

[54] CO-SOLVENT SYSTEM FOR REMOVING CURED FIBERGLASS RESIN AND CURED FLEXIBLE OR RIGID URETHANE FOAMS FROM SUBSTRATES

[75] Inventors: Edward T. Marquis; Michael Cuscurida, both of Austin, Tex.

[73] Assignee: Texaco Chemical Company, White Plains, N.Y.

[21] Appl. No.: 610,635

[22] Filed: Nov. 8, 1990

[51] Int. Cl.$^5$ ............... C09D 9/00; C11D 7/22; C11D 7/50
[52] U.S. Cl. ................... 252/162; 252/153; 252/170; 252/171; 252/172; 252/DIG. 8; 134/38; 134/39; 134/40
[58] Field of Search ............... 252/153, 162, 170, 171, 252/172, DIG. 8; 134/38, 39, 40

[56] References Cited

U.S. PATENT DOCUMENTS

| | | |
|---|---|---|
| Re. 27,432 | 7/1972 | Torrenzano et al. . |
| 3,765,839 | 10/1973 | Mueller et al. ............... 8/560 |
| 3,953,234 | 4/1976 | Hoffmann ............... 204/58.5 |
| 3,974,116 | 8/1976 | Lissant ............... 252/8.515 |
| 4,009,048 | 2/1977 | Jensen et al. . |
| 4,028,299 | 6/1977 | Olstowski . |
| 4,514,530 | 4/1985 | Seelstrom et al. . |
| 4,594,111 | 6/1986 | Coonan . |
| 4,645,617 | 2/1987 | Vivian . |
| 4,677,088 | 6/1987 | Huff et al. ............... 502/121 |
| 4,680,133 | 7/1987 | Ward . |
| 4,780,235 | 10/1988 | Jackson . |

FOREIGN PATENT DOCUMENTS

| | | |
|---|---|---|
| 60-121273 | 6/1985 | Japan . |
| 670832A5 | 7/1989 | Switzerland . |
| 1201523 | 8/1970 | United Kingdom . |

OTHER PUBLICATIONS

H. L. Jackson and R. J. Gallagher, Jr., "DBE Purges Polyurethane Equipment Without Methylene Chloride Risks", *Elastomerics*, Oct. 1990, pp. 59–60.

A. Luttringhaus and H. W. Dirkson, "Tetramethylurea as a Solvent and Reagent", Angew. Chem. Internat. Edit. vol. 3 (1964) No. 4, pp. 260–269.

*Primary Examiner*—A. Lionel Clingman
*Assistant Examiner*—William S. Parks
*Attorney, Agent, or Firm*—Jack H. Park; Kenneth R. Priem; Russell R. Stolle

[57] ABSTRACT

A co-solvent system for the dissolution of cured flexible polyurethane foams, cured rigid polyurethane foams, and cured polyester resins is disclosed. The co-solvent system comprises a mixture of an alkylene carbonate and tetramethyl urea.

7 Claims, No Drawings

CO-SOLVENT SYSTEM FOR REMOVING CURED FIBERGLASS RESIN AND CURED FLEXIBLE OR RIGID URETHANE FOAMS FROM SUBSTRATES

BACKGROUND OF THE INVENTION

1. Field of the Invention

The invention relates to solvents for softening, loosening, or removing cured fiberglass resin and cured flexible or rigid urethane foams from tools, processing equipment and other substrates.

2. Description of Related Methods

A variety of solvents have been used to flush urethane processing equipment and clean metal parts and tools after urethane foam has cured on them. Some of the solvents used include such compounds as dimethyl formamide, 1,1,1-trichloroethane, methylene chloride, chlorofluorocarbons, toluene, xylene, acetone, methyl ethyl ketone, ethylene glycol ethers, tetrahydrofuran, and $\gamma$-butyrolactone. However, though these compounds are effective solvents, the use of each presents a hazard or complication of one type or another. For example, the chlorine-containing compounds are now thought to contribute to ozone depletion in the atmosphere. The other solvents are either toxic, suspected carcinogens, or very volatile, and thus present health and safety problems. An alternative solvent, n-methyl pyrrolidone, is more easily handled, and presents fewer environmental problems, but is expensive. Thus, it would be a substantial improvement in the art if a relatively inexpensive yet effective solvent formulation were available to remove cured rigid and flexible urethane foams, and that did not present the environmental, health and safety problems of the prior art solvent formulations.

Acetone, methyl ethyl ketone, and diacetone alcohol are the solvents most commonly used to remove cured polyester resin (fiberglass) from machine parts and tools. However, acetone and methyl ethyl ketone are not favored because of safety hazards resulting from their high volatilities and low flash points. Diacetone alcohol is very polar, and therefore presents other problems when used alone. Thus, it also would be a substantial improvement in the art if a solvent formulation were available that was effective for removing polyester resin, yet did not present the problems associated with the prior art solvents mentioned above.

Applicants have discovered, surprisingly, that a co-solvent system comprising an alkylene carbonate and tetramethyl urea will dissolve cured polyester resins and cured rigid or flexible polyurethane foams. Additionally, the co-solvent system of the present invention avoids many of the health, safety and environmental problems associated with the prior art solvents, and is economically attractive as well.

SUMMARY OF THE INVENTION

The invention concerns a co-solvent system for removing from a substrate a material selected from the group consisting of cured flexible polyurethane foam, cured rigid polyurethane foam, and cured polyester resin, comprising a mixture of an alkylene carbonate and tetramethyl urea. In another of its aspects, the invention concerns a process for removing from a substrate a material selected from the group consisting of cured flexible polyurethane foam, cured rigid polyurethane foam, and cured polyester resin, comprising contacting said material with a co-solvent system comprising a mixture of an alkylene carbonate and tetramethyl urea.

DESCRIPTION OF THE PREFERRED EMBODIMENTS

The co-solvent systems of the present invention comprise a mixture of an alkylene carbonate and tetramethyl urea. Alkylene carbonates useful in the present invention may be represented by the following formula:

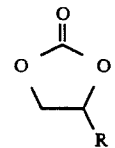

where R is H or an alkyl group. It is preferred that R be H or a methyl group, i.e. that the alkylene carbonate be ethylene carbonate or propylene carbonate. Ethylene carbonate and propylene carbonate are commercially available from Texaco Chemical Co. as Texacar ® EC Ethylene Carbonate and Texacar ® PC Propylene Carbonate, respectively. Alternatively, a mixture of alkylene carbonates may be used, preferably a mixture of ethylene carbonate and propylene carbonate, such as, for example, Texacar ® EC-50. Tetramethyl urea also is commercially available.

The solvent formulations of the present invention include those containing an alkylene carbonate and tetramethyl urea in any relative weight percentage. Preferably, the alkylene carbonate and tetramethyl urea are present in a weight ratio of alkylene carbonate to tetramethyl urea of about 1:4 to about 4:1. It is more preferred that the alkylene carbonate and tetramethyl urea be present in a weight ratio of alkylene carbonate to tetramethyl urea of about 1:1. It is most preferred that the alkylene carbonate and tetramethyl urea be present in a weight ratio of alkylene carbonate to tetramethyl urea of about 1:2. One skilled in the art may find other weight ratios to be optimum and not depart from the scope of the present invention.

Optionally, other solvents may be added to the formulations of the present invention. For example, Applicants have obtained excellent results using formulations containing, in addition to an alkylene carbonate and tetramethyl urea, one or more of the following solvents: toluene, methyl isobutyl ketone, and isobutyl isobutyrate. Where it is desirable to add an additional solvent to the alkylene carbonate/tetramethyl urea mixture, toluene is preferred. Other aromatic hydrocarbons, ketones and esters may be added to the alkylene carbonate and tetramethyl urea formulation, in addition to or in lieu of those mentioned above. Those skilled in the art will appreciate that the use of such additional solvents involves the consideration of obtaining an increase in percent of material loosened or dissolved versus the possible additional expense and increase in environmental, health and safety risks associated with the extra solvents. Applicants have demonstrated several different formulations in the examples that follow.

Optionally, other additives may be employed in the formulations of the present invention. For example, suitable thickeners may be included, such as ethylcellulose, hydroxypropyl cellulose, organic modified clay, hydrogenated castor oil, and the like. Surfactants, to enhance the water washability of the substrate, may be included as well. Suitable surfactants include potassium oleate, the dioctyl ester of sodium sulfosuccinic acid, sodium alkylnaphthalene sulfonate, sodium alkylbenzene sulfonate, and the like.

Applicants' invention is effective at temperatures of from about room temperature to about 75° C. and at pressures of from about atmospheric to several hundred psi. Optionally, the co-solvent system may be heated prior to or during application to the material to be removed from the substrate. The formulations of the present invention may be applied in a conventional manner to the tools, processing equipment, machine parts, or other substrates from which the cured foam or resin is to be removed. Typically, the solvent formulations of the present invention will be used at room temperature in a soaking process or in a sonic bath. The period of time for which the solvent formulation should be permitted to work undisturbed on the resin or foam to be removed will vary. After said period of time, agitation of the surfaces to be cleaned of the foam or resin via wiping, brushing or scraping is preferred.

The invention will be further illustrated by the following examples, which are given by way of illustration and not as limitations on the scope of this invention.

EXAMPLES

In the examples recorded in the tables below, the following procedure was used. Previously coated stainless steel ¾" screw stock rods were wire brushed and cleaned with a solvent. Rods that had been coated with cured fiberglass were treated with acetone to remove any fiberglass residue; those that had been coated with cured flexible or rigid polyurethane foam were treated with methylene chloride. The rods were then sand blasted with micro beads. The rods were then coated with the materials to be removed by the co-solvent systems tested. The coatings were then allowed to cure. Each coated stock rod was then suspended in a beaker from a ring stand. Each beaker contained one of the co-solvent systems to be tested. At the bottom of each beaker was a stirring bar. After from about 16 to about 22 hours at room temperature the rods were observed and the approximate percentage of material removed by each co-solvent was estimated and recorded.

| Ex. No. | Type of Material | Co-Solvent System Components | Wt. Ratio of Components | Approximate % Material Removed |
|---|---|---|---|---|
| | Cured on Rod | | | |
| 1 | Cured Flexible Urethane Foam | EC/TMU/MIBK/Toluene | 26.3/41.8/41.6/41.9 | 100% |
| 2 | Cured Flexible Urethane Foam | EC/TMU/Toluene | 66.4/59.2/59.0 | 95% |
| 3 | Cured Flexible Urethane Foam | EC/TMU/IBIB | 66.4/59.2/58.2 | 90% |
| 4 | Cured Flexible Urethane Foam | EC/TMU/IBIB/Toluene | 47.4/43.5/42.9/41.9 | 90% |
| 5 | Cured Flexible Urethane Foam | EC/TMU/MIBK | 64.0/57.4/57.3 | 90% |
| 6 | Cured Flexible Urethane Foam | EC/TMU | 106.7/95.7 | 50% |
| 7 | Cured Flexible Urethane Foam | PC/TMU/Toluene | 1/1/1 | 100% |
| 8 | Cured Flexible Urethane Foam | PC/TMU | 1/1 | 95% |
| 9 | Cured Flexible Urethane Foam | PC/TMU/IBIB | 1/1/1 | 95% |
| 10 | Cured Flexible Urethane Foam | PC/TMU/IBIB/Toluene | 1/1/1/1 | 95% |
| 11 | Cured Flexible Urethane Foam | PC/TMU/MIBK/Toluene | 1/1/1/1 | 90% |
| 12 | Cured Flexible Urethane Foam Coating Rod | PC/TMU/MIBK | 1/1/1 | 75% |
| 13 | Cured Polyester Resin | EC/TMU/IBIB | 73/65.1/64 | 25% |
| 14 | Cured Polyester Resin | TMU | 100% | 70% |
| 15 | Cured Polyester Resin | EC/TMU/MIBK | 67.8/69/59.8 | 25% |
| 16 | Cured Polyester Resin | PC/TMU | 1/1 | 10-25% |
| 17 | Cured Rigid Urethane Foam | TMU | 100% | 100% |
| 18 | Cured Rigid Urethane Foam | PC/TMU | 1/2 | 80% |
| 19 | Cured Rigid Urethane Foam | PC/TMU | 1/1 | 50% |
| 20 | Cured Rigid Urethane Foam | PC/TMU | 2/1 | 5% |
| 21 | Cured Rigid Urethane Foam | PC | 100% | 0 |

EC = Ethylene Carbonate;
PC = Propylene Carbonate;
TMU = Tetramethyl urea;
MIBK = Methyl isobutyl ketone;
IBIB = Isobutyl isobutyrate.

The cured flexible urethane foam used in the examples above contained the following components:

| Component | Parts by Weight |
|---|---|
| Thanol ® SF-5505[1] | 60.0 |
| Niax ® 34-28 Polymer Polyol[2] | 40.0 |
| Deionized Water | 3.5 |
| Diethanolamine | 1.5 |
| Silicon Oil L-5309[3] | 1.5 |
| TEXACAT ®-33A[4] (33% TEDA in DPG) | 0.5 |
| UL-1 (organotin in cmp.)[5] | 0.0065 |
| Toluene diisocyanate | 44.5 |

[1]Arco;
[2]Union Carbide;
[3]Union Carbide;
[4]Texaco Chemical Co.;
[5]Witco Fomrez ®.

The cured rigid urethane foam used in the examples above contained the following components:

| Component | Parts by Weight |
|---|---|
| Thanol ® R-350-X | 36.9 |
| DC-193[1] (silicon surfactant) | 0.5 |
| R11 (trichlorofluoromethane) | 15.0 |
| TEXACAT ® TD-33 | 0.3 |
| Rubinate M[2] (polymeric isocyanate) | 49.6 |

[1]Dow Corning;
[2]ICI.

The cured fiberglass resin used in the examples above was Bradcoat ©(Bradson Supply Inc.) unsaturated polyester in styrene, which was cured with methyl ethyl ketone peroxide.

We claim:

1. A co-solvent system for removing from a substrate a material selected from the group consisting of cured flexible polyurethane foam, cured rigid polyurethane foam, and cured polyester resin, consisting essentially of a mixture of an alkylene carbonate and tetramethyl urea in a weight ratio of alkylene carbonate to tetramethyl urea of about 1:4 to about 4:1, which mixture will at least partially remove from a substrate a material selected from the group consisting of cured flexible polyurethane foam, cured rigid polyurethane foam, and cured polyester resin.

2. The co-solvent system of claim 1, in which the alkylene carbonate is ethylene carbonate.

3. The co-solvent system of claim 1, in which the alkylene carbonate is propylene carbonate.

4. The co-solvent system of claim 1, in which the alkylene carbonate and tetramethyl urea are present in the mixture in a weight ratio of alkylene carbonate to tetramethyl urea of about 1:1.

5. The co-solvent system of claim 1, in which the alkylene carbonate and tetramethyl urea are present in the mixture in a weight ratio of alkylene carbonate to tetramethyl urea of about 1:2.

6. The co-solvent system of claim 1, further consisting essentially of a solvent selected from the group consisting of toluene, methyl isobutyl ketone, and isobutyl isobutyrate in a weight ratio of said solvent to the sum of tetramethyl urea and alkylene carbonate not greater than about 1:1.

7. The co-solvent system of claim 1, further consisting essentially of toluene in a weight ratio of toluene to the sum of tetramethyl urea and alkylene carbonate not greater than about 1:1.

* * * * *